US007304783B2

United States Patent
Ishii

(10) Patent No.: US 7,304,783 B2
(45) Date of Patent: Dec. 4, 2007

(54) CONTROL OF MICROMIRRORS WITH INTERMEDIATE STATES

(76) Inventor: Fusao Ishii, 350 Sharon Park Dr. G26, Menlo Park, CA (US) 94022

( * ) Notice: Subject to any disclaimer, the term of this patent is extended or adjusted under 35 U.S.C. 154(b) by 215 days.

(21) Appl. No.: 11/136,041

(22) Filed: May 23, 2005

(65) Prior Publication Data

US 2005/0206992 A1    Sep. 22, 2005

Related U.S. Application Data

(63) Continuation-in-part of application No. 10/698,620, filed on Nov. 1, 2003, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(51) Int. Cl.
*G02B 26/00*      (2006.01)

(52) U.S. Cl. .................. 359/290; 359/291; 359/292

(58) Field of Classification Search ........... 359/291, 359/290, 292, 295, 298, 296, 297
See application file for complete search history.

(56) References Cited

U.S. PATENT DOCUMENTS 7,023,607 B2 * 4/2006 Huibers ............... 359/291
2004/0008402 A1 * 1/2004 Patel et al. ............ 359/291

* cited by examiner

*Primary Examiner*—Ricky Mack
*Assistant Examiner*—Brandi Thomas
(74) *Attorney, Agent, or Firm*—Bo-In Lin

(57) ABSTRACT

A micromirror device with at least one intermediate state is disclosed in this invention with the reflecting mirror placed at an angular position between a fully on angle and fully off angle. The micromirror device includes a reflecting element supported on a hinge for oscillating and positioning at least three angular positions. The micromirror device further has a control circuit for receiving a series of control words of different number of bits as a time modulation signal to control the reflecting element for controlling a gray scale of display wherein the control circuit further receiving an oscillation signal for superimposing on the time modulation signal for oscillating the reflecting element for further controlling the gray scale of display. The series of control words further includes a sequence of control words of a least number of bits to a maximum number of bits of a least number of bits to a maximum number of bits with a time gap between each of the control words. The oscillating signal may be inserted optionally into a gap between the control words, into every control word, into a control word of the MSB, or into a control word of the LSB, In a preferred embodiment, the oscillating signal is applied to dispose the reflecting element at an intermediate state with a zero degree relative to an incident light.

54 Claims, 8 Drawing Sheets

CONTROL OF MICROMIRRORS WITH INTERMEDIATE STATES

This application is a Continuation in Part (CIP) Application of pending U.S. patent application Ser. No. 10/698,620 filed on Nov. 1, 2003, Ser. No. 10/699,140 filed on Nov. 1, 2003, now U.S. Pat. No. 6,862,127 and Ser. No. 10/699,143 filed on Nov. 1, 2003 now U.S. Pat. No. 6,903,860 by the Applicant of this Patent Applications. The disclosures made in these Patent Applications are hereby incorporated by reference in this Patent Application.

TECHNICAL FIELD

This invention relates to micromirror arrays and control circuits to control the micromirrors. More particularly, this invention relates to control circuits for controlling the micromirrors to oscillate through multiple angular positions for providing intermediate states to implement the micromirror array as spatial light modulators (SLMs) thus enabling more accurately controllable gray scales.

BACKGROUND ART

Even though there are significant advances made in recent years on the technologies of implementing electromechanical micromirror devices as spatial light modulator, there are still limitations and difficulties when employed to provide high quality images display. Specifically, when the display images are digitally controlled, the image qualities are adversely affected due to the fact that the image is not displayed with sufficient number of gray scales.

Electromechanical micromirror devices have drawn considerable interest because of their application as spatial light modulators (SLMs). A spatial light modulator requires an array of a relatively large number of micromirror devices. In general, the number of devices required ranges from 60,000 to several million for each SLM. Referring to FIG. 1A for a digital video system 1 disclosed in a relevant U.S. Pat. No. 5,214,420 that includes a display screen 2. A light source 10 is used to generate light energy for ultimate illumination of display screen 2. Light 9 generated is further concentrated and directed toward lens 12 by mirror 11. Lens 12, 13 and 14 form a beam columnator to operative to columnate light 9 into a column of light 8. A spatial light modulator 15 is controlled by a computer through data transmitted over data cable 18 to selectively redirect a portion of the light from path 7 toward lens 5 to display on screen 2. The SLM 15 has a surface 16 that includes an array of switchable reflective elements, e.g., micromirror devices 32, such as elements 17, 27, 37, and 47 as reflective elements attached to a hinge 30 that shown in FIG. 1B. When element 17 is in one position, a portion of the light from path 7 is redirected along path 6 to lens 5 where it is enlarged or spread along path 4 to impinge the display screen 2 so as to form an illuminated pixel 3. When element 17 is in another position, light is not redirected toward display screen 2 and hence pixel 3 would be dark.

The on-and-off states of micromirror control scheme as that implemented in the U.S. Pat. No. 5,214,420 and by most of the conventional display system imposes a limitation on the quality of the display. Specifically, when applying conventional configuration of control circuit has a limitation that the gray scale of conventional system (PWM between ON and OFF states) is limited by the LSB (least significant bit, or the least pulse width). Due to the On-Off states implemented in the conventional systems, there is no way to provide shorter pulse width than LSB. The least brightness, which determines gray scale, is the light reflected during the least pulse width. The limited gray scales lead to degradations of image display.

Specifically, in FIG. 1C an exemplary circuit diagram of a prior art control circuit for a micromirror according to U.S. Pat. No. 5,285,407. The control circuit includes memory cell 32. Various transistors are referred to as "M*" where * designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads presented to memory cell 32. Memory cell 32 includes an access switch transistor M9 and a latch 32a, which is the basis of the static random access switch memory (SRAM) design. All access transistors M9 in a row receive a DATA signal from a different bit-line 31a. The particular memory cell 32 to be written is accessed by turning on the appropriate row select transistor M9, using the ROW signal functioning as a wordline. Latch 32a is formed from two cross-coupled inverters, M5/M6 and M7/M8, which permit two stable states. State 1 is Node A high and Node B low and state 2 is Node A low and Node B high.

The dual states switching as illustrated by the control circuit controls the micromirrors to position either at an ON of an OFF angular orientation as that shown in FIG. 1A. The brightness, i.e., the gray scales of display for a digitally control image system is determined by the length of time the micromirror stays at an ON position. The length of time a micromirror is controlled at an ON position is in turned controlled by a multiple bit word. For simplicity of illustration, FIG. 1D shows the "binary time intervals" when control by a four-bit word. As that shown in FIG. 1D, the time durations have relative values of 1, 2, 4, 8 that in turn define the relative brightness for each of the four bits where 1 is for the least significant bit and 8 is for the most significant bit. According to the control mechanism as shown, the minimum controllable differences between gray scales for showing different brightness is a brightness represented by a "least significant bit" that maintaining the micromirror at an ON position. For practical implementation, the control signals with different binary bits are inputted to the control circuits as shown in FIG. 1E. There is generally a small time gap between control words of different bit lengths as shown.

When adjacent image pixels are shown with great degree of different gray scales due to a very coarse scale of controllable gray scale, artifacts are shown between these adjacent image pixels. That leads to image degradations. The image degradations are specially pronounced in bright areas of display when there are "bigger gaps" of gray scales between adjacent image pixels. It was observed in an image of a female model that there were artifacts shown on the forehead, the sides of the nose and the upper arm. The artifacts are generated due to a technical limitation that the digital controlled display does not provide sufficient gray scales. At the bright spots of display, e.g., the forehead, the sides of the nose and the upper arm, the adjacent pixels are displayed with visible gaps of light intensities.

As the micromirrors are controlled to have a fully on and fully off position, the light intensity is determined by the length of time the micromirror is at the fully on position. In order to increase the number of gray scales of display, the speed of the micromirror must be increased such that the digital control signals can be increased to a higher number of bits. However, when the speed of the micromirrors is increased, a strong hinge is necessary for the micromirror to sustain a required number of operational cycles for a designated lifetime of operation, In order to drive the micromirrors supported on a further strengthened hinge, a higher voltage is required. The higher voltage may exceed twenty volts and may even be as high as thirty volts. The micromirrors manufacture by applying the CMOS technologies probably would not be suitable for operation at such higher range of voltages and therefore the DMOS micromirror devices may be required. In order to achieve higher degree of gray scale control, a more complicate manufacturing process and larger device areas are necessary when DMOS micromirror is implemented. Conventional modes of micromirror control are therefore facing a technical challenge that the gray scale accuracy has to be sacrificed for the benefits of smaller and more cost effective micromirror display due to the operational voltage limitations.

There are many patents related to spatial light modulation that includes U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions have not addressed and provided direct resolutions for a person of ordinary skill in the art to overcome the above-discussed limitations and difficulties.

Therefore, a need still exists in the art of image display systems applying digital control of a micromirror array as a spatial light modulator to provide new and improved systems such that the above discussed difficulties can be resolved.

SUMMARY OF THE INVENTION

The present invention relates to control circuits for micromirror devices and arrays of micromirror devices. The purpose of controlling the arrays is to apply such array as spatial light modulators (SLMs). In one aspect, the present invention provides a micromirror device in which the reflecting element is controlled to reflect light for image display at multiple intermediate positions for providing more flexibly controllable gray scales of display without requiring a higher speed of micromirror oscillation thus maintaining a low operational voltage.

In another aspect, the present invention provides a micromirror device operated with an ON state, an OFF state and an intermediate Oscillating state.

In yet another aspect, the present invention provides a micromirror device comprising an array of micromirrors that are controlled to operate with intermediate oscillating states to provide a least brightness that is a fraction, e.g., approximately 37%, of the fully ON state. The gray scale for display is now controllable to project finer scale of brightness differences between adjacent pixels with an additional controllable state to provide a fraction of brightness of the fully-on state for display. The annoying artifacts shown on a display caused by adjacent pixels having huge gray scale gaps can be significantly reduced.

In yet another aspect, the present invention provides a method of control the oscillation an array of micromirror devices wherein the micromirrors are enabled to oscillate in a reverse direction or stop before the micromirror completes a full oscillation cycle. Aided by such control flexibility and the fractional brightness for image display during an intermediate oscillation state, additional flexibilities are now provided to fine tune the gray scale for each image pixel especially for the high brightness display area where a gray scale difference are proportionally amplified due to the high intensity of light projections.

These and other objects and advantages of the present invention will no doubt become obvious to those of ordinary skill in the art after having read the following detailed description of the preferred embodiment, which is illustrated in the various drawing figures.

BRIEF DESCRIPTION OF FIGURES

The present invention is described in detail below with reference to the following Figures.

DESCRIPTION OF PREFERRED EMBODIMENTS

Figure 1A:
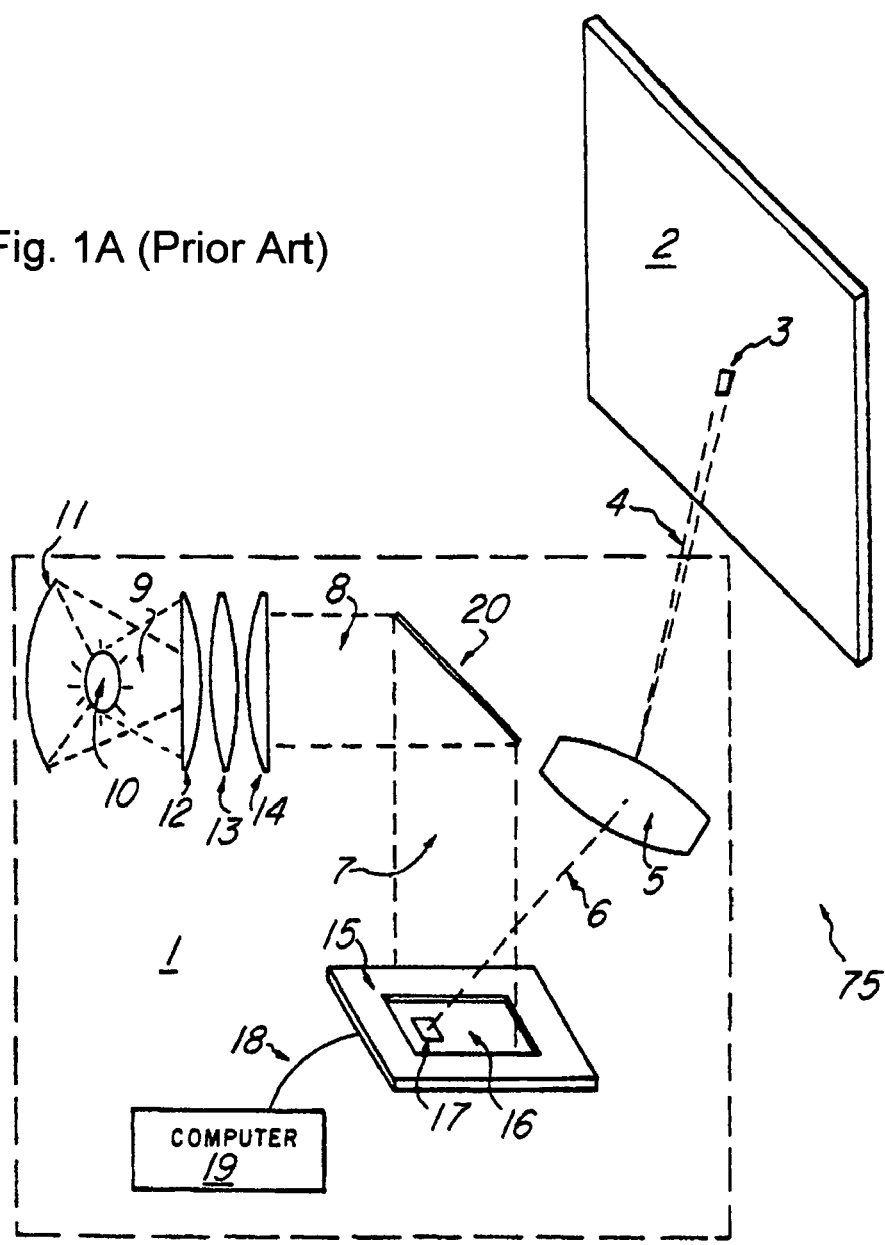
FIGS. 1A and 1B are functional block diagram and a top view of a portion of a micromirror array implemented as a spatial light modulator for a digital video display system of a conventional display system disclosed in a prior art patent.
Figure 1B:
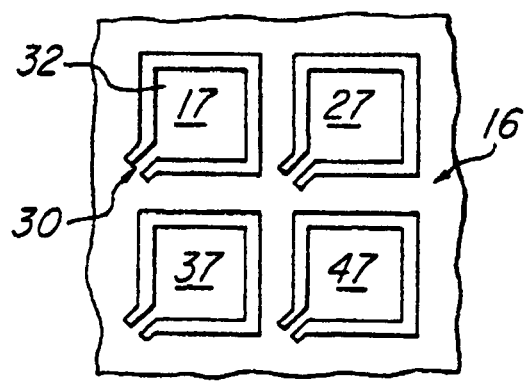
Figure 1C:
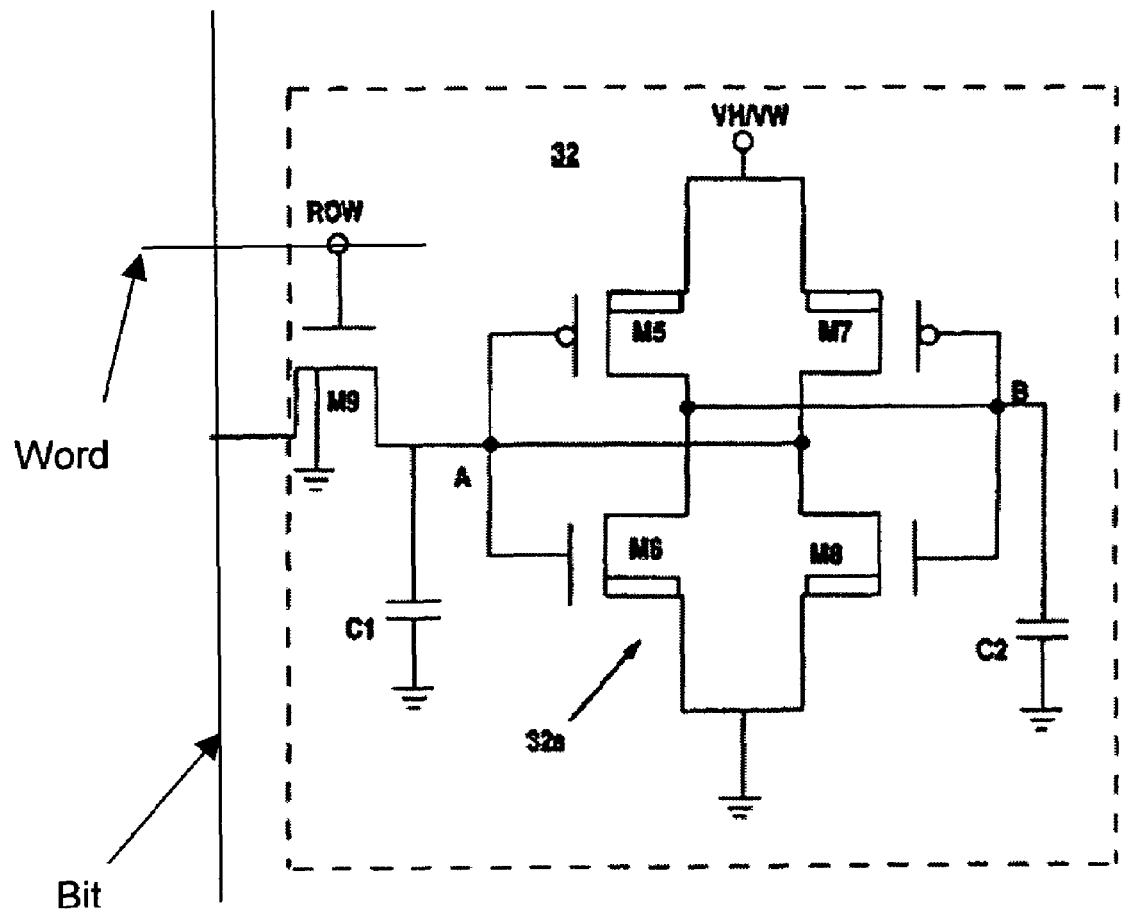
FIG. 1C is a circuit diagram for showing a prior art circuit for controlling a micromirror to position at an ON and OFF states of a spatial light modulator.
Figure 1D:
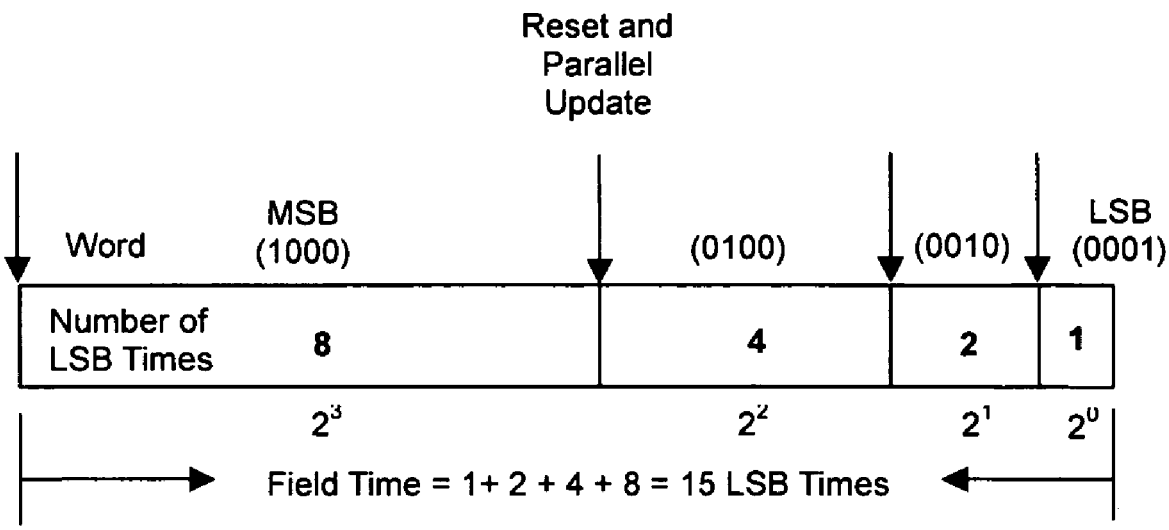
FIG. 1D is diagram for showing the binary time intervals for a four bit gray.
Figure 1E:
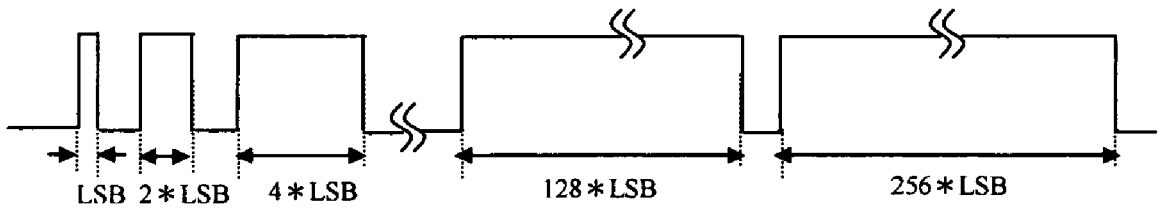
FIG. 1E is a timing diagram for illustrating practical implementation of the eight bits control word ranging from the least significant bit (LSB) to the most significant bit (MSB).
Figure 2:
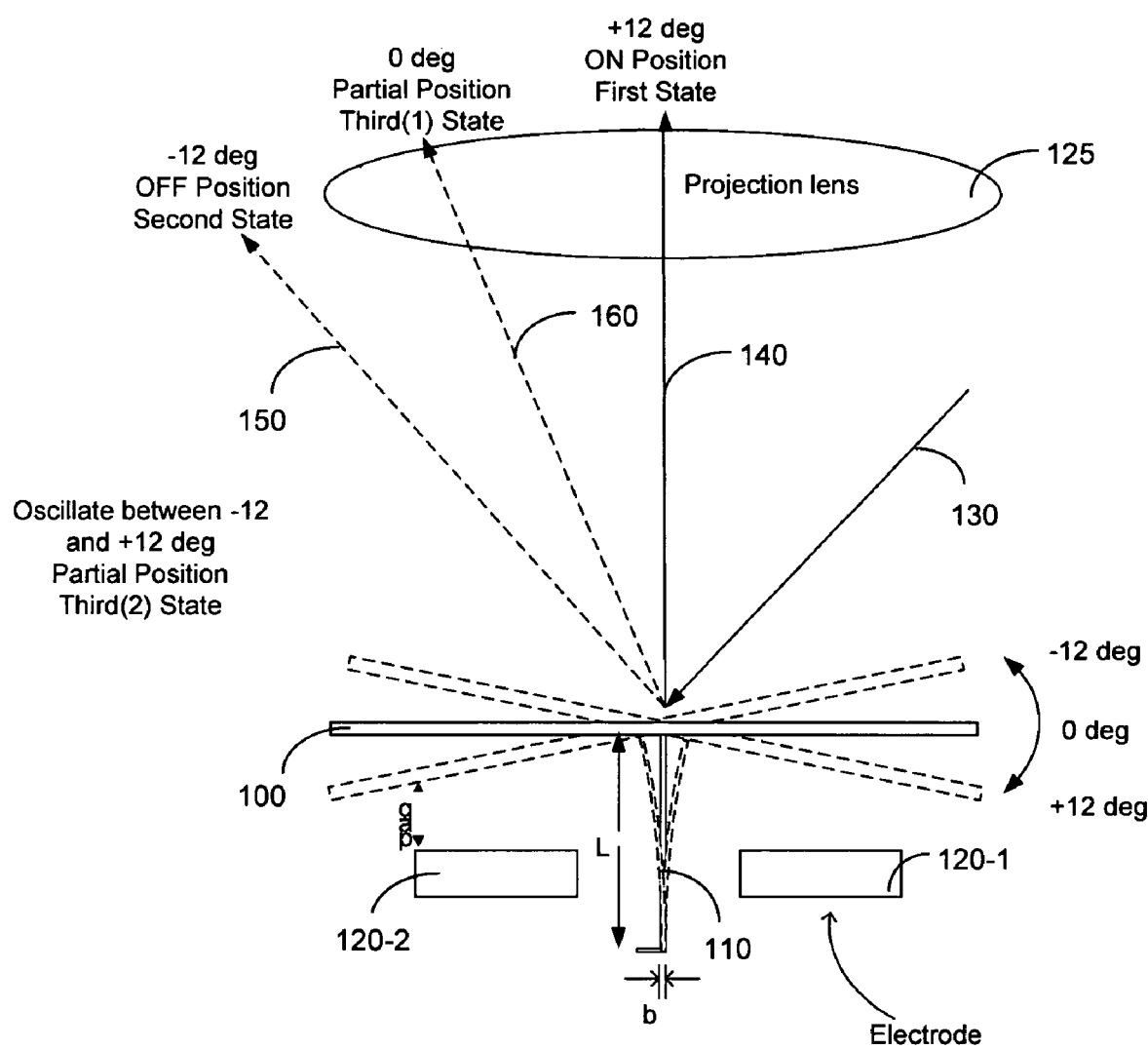
FIG. 2 is a side cross sectional diagram of a micromirror device of this invention wherein the micromirror is oscillating between an ON-OFF position for providing at least an intermediate state.

Referring to FIG. 2 for a side cross sectional view for illustrating the oscillating motions of a micromirrors according to the control circuit of the present invention. A micromirror 100 supported on a hinge 110 formed on a substrate (not shown), is electrically controlled by two electrodes 120-1 and 120-2 to move to different positions, e.g., from +12 degrees to −12 degrees as shown. The incident light is projected along an optical path 130 and the light reflected from the micromirror 100 is projected to a projection lens 125 for further projecting to a display surface (not shown). The mirror surface is multi-layer to achieve higher reflection. An Aluminum surface can provide 90-92% reflectance but multi-layer can provide a higher reflection up to 98%. The micromirror is controlled to move to a full-on state when the micromirror is positioned at the +12 degrees with the reflected light projected fully onto the projection lens along a 140 direction perpendicular to the projection lens 125. The micromirror 100 is controlled to move to a full-off state when the micromirror 100 is positioned at a −12 degrees with the reflected light 150 totally misses the projection lens 125. In a preferred embodiment, the micromirror 100 is controlled to move to an intermediate state when the micromirror is controlled to move to a zero degree position when the reflected light is projected along a third state direction 160. In different preferred embodiments, the micromirrors can be oscillating between a positive and negative angle relative to a perpendicular axis to the surface of the micromirror. The fully on and fully off positions as defined by these positive and negative angles can be flexibly designed depending on the system specifications for each specific application.

Figure 3:
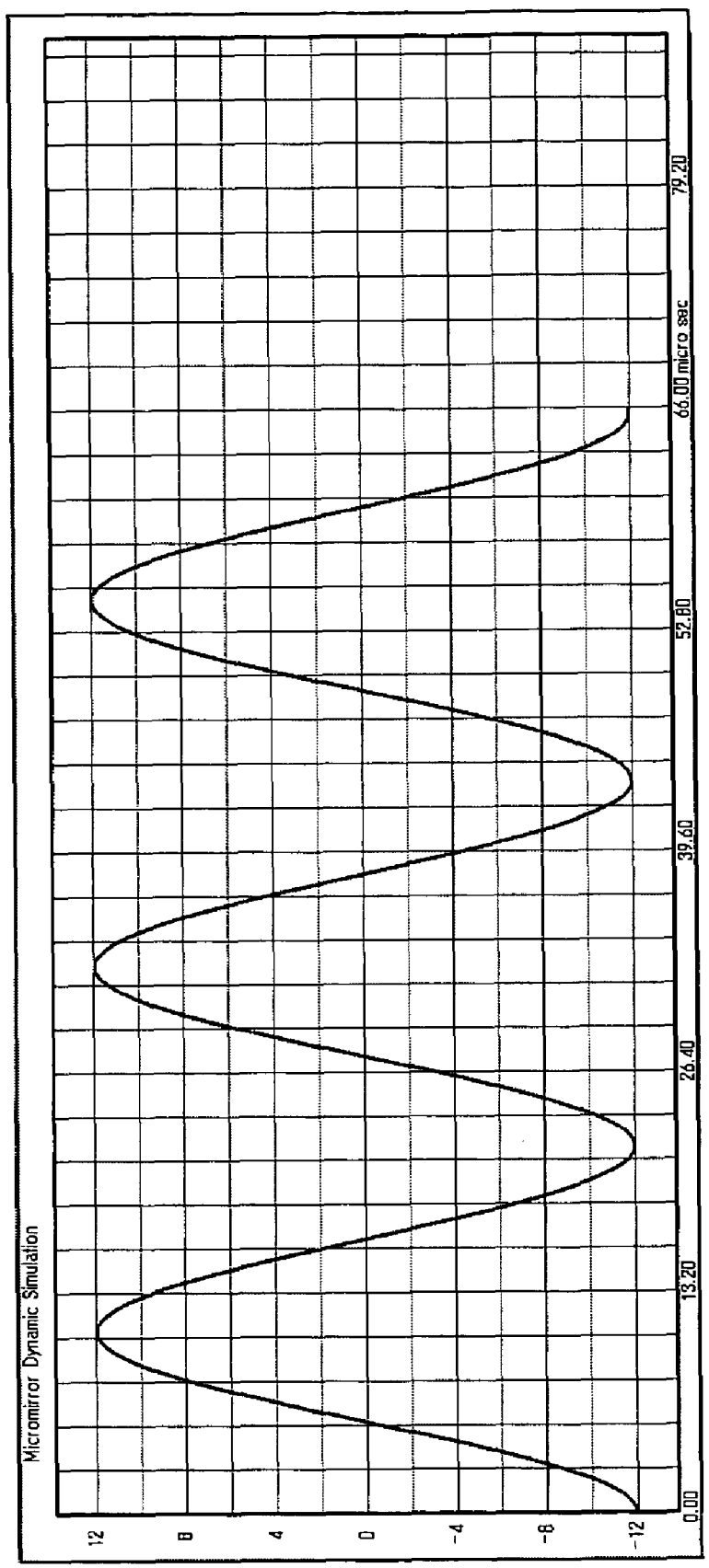
FIG. 3 is a diagram for showing the micromirror angle versus time for computing an illumination to display an image with different light intensities wherein one-oscillating cycle provides approximately 37% light intensity of the fully-on state.

Referring to FIG. 3 for a waveform diagram showing the mirror angular position changes with time as the micromirror oscillates from the on state to an off state. A computation is performed to compute the light projection through the projection lens 125 for image display. During an oscillating condition, there is 37% of the light of the fully on state. For example, if 20 microseconds of an ON time provide a light output of one lumen, then the one oscillating cycle provides 0.37 lumen output of light. For the purpose of minimize oscillation decay of the micromirrors 100, the micromirror array is contained and operated in a vacuum-sealed environment. With a partial light projection of light to contribute to the image light intensity, a higher number of gray scales are achievable without requiring a high speed of mirror oscillation. The micromirror devices can be controlled at a voltage substantially lower than twenty volts, e.g., around five volts, such that the spatial light modulator (SLM) can be implemented with CMOS technologies. Optionally, the SLM can also be implemented with DMOS, PMOS and NMOS technologies.

Figure 4:
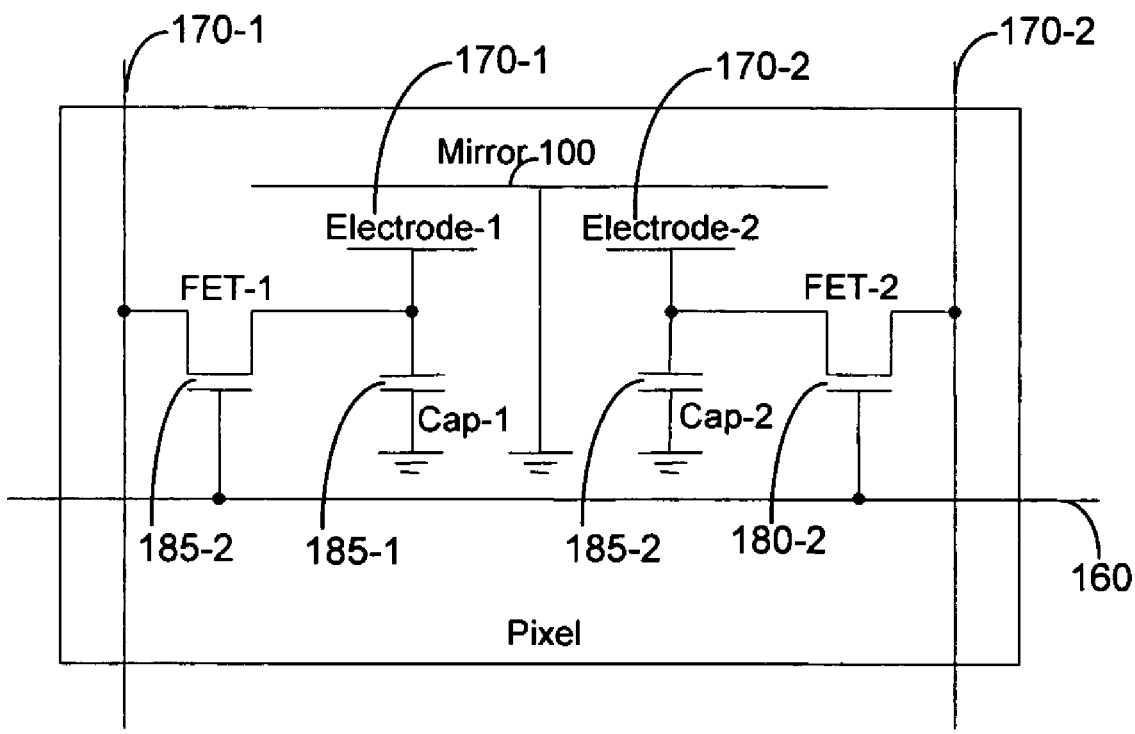
FIG. 4 is a circuit diagram for controlling a micromirror of this invention.

Referring to FIG. 4 for a preferred embodiment showing a control circuit to control the oscillation of the micromirror 100 to position at an ON state, an OFF state and an intermediate state based on the ON-OFF states of the electrodes 120-1 and 120-2. The control circuit includes a wordline 160 and two bit-lines 170-1 and 170-2 to alternate turn on two transistors 180-1 and 180-2, e.g., FET-1 and FET-2 respectively. Each of these transistors 180-1 and 180-2 is connected to a capacitor 185-1 and 185-2, e.g., Cap-1 and Cap-2 respectively. Each micromirror for display of one pixel is therefore control to have multiple states depending on the input to the bit-lines 170-1 and 170-2. Specifically, the control table can be represented as the followings:

TABLE 1

| Bit #1 | Bit #2 | State |
|---|---|---|
| 1 | 0 | ON |
| 0 | 1 | OFF |
| 0 | 0 | Intermediate |
| 1 | 1 | Undefined |

Referring to FIG. 5 for an exemplary timing diagram for illustrating the changes of control states between a first state, an intermediate state and a second state. The first state is a fully ON state to provide a highest brightness. The second state is an OFF state to provide a lowest brightness. Additionally, there is an intermediate state as a third state for providing flexibility to adjust brightness thus controls the gray scale of each image pixel.

Figure 5A:
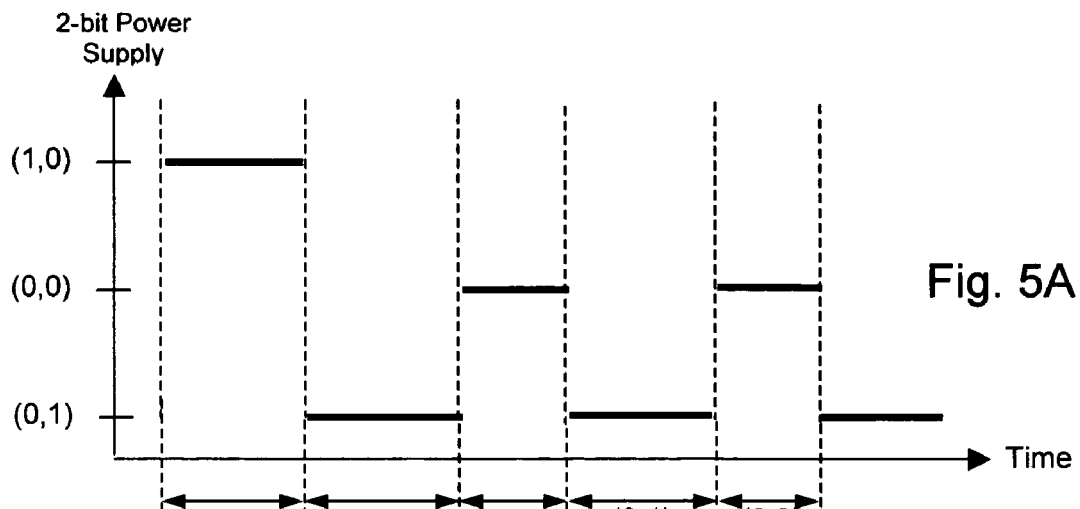
FIG. 5A is a diagram for showing the change of micromirror states over time wherein the micromirror may be controlled to position at three different states.
Figure 5B:
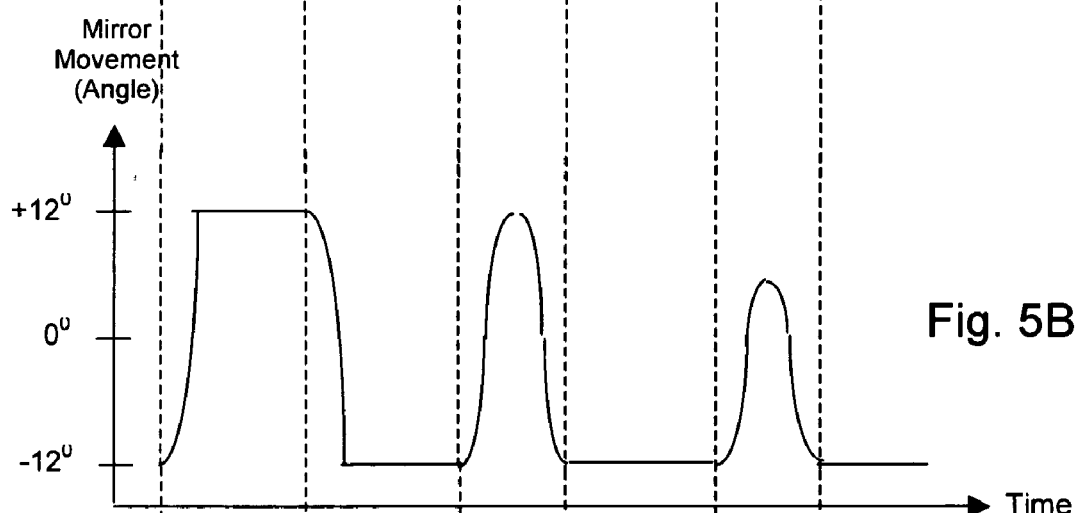
FIG. 5B is a diagram for showing the micromirror oscillation from one position to a different positions according to the different states shown in FIG. 5A.

As shown in the timing diagram of FIG. 5A and FIG. 5B, the oscillating micromirror is provided with flexibility to oscillate between the first, second and third states. The micromirror is oriented at +12 degrees at a fist state. The micromirror is oriented at a −12 degrees at a second state and oriented at zero degree at an intermediate state. either at the end of the oscillating cycles or in an intermediate points that may be a fraction of an oscillating cycle.

Figure 5C:
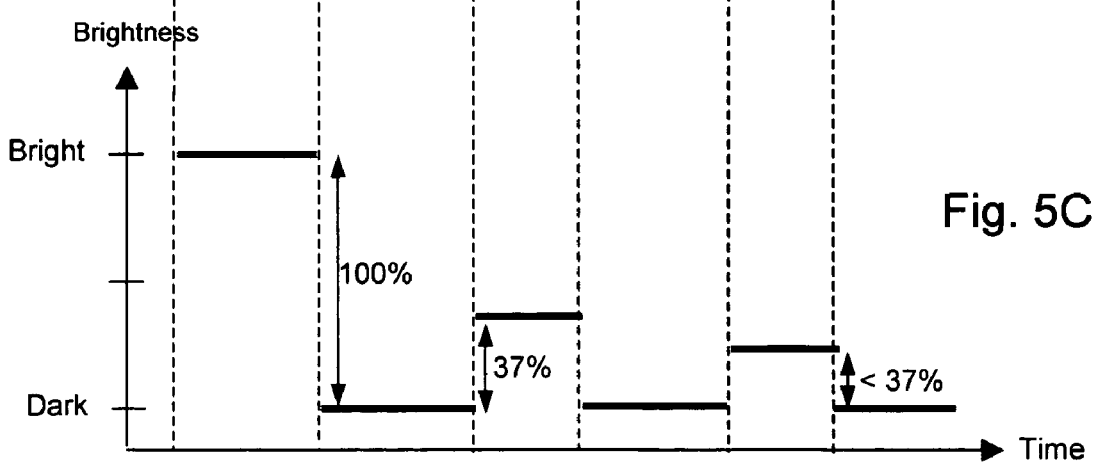
FIG. 5C is a diagram for showing the brightness as the micromirror oscillating between different states according to that shown in FIGS. 5A and 5B.

As shown in the timing diagram of FIG. 5C, the brightness of an image pixel as projected from a micromirror is a function of the length of the time the micromirror stays at a certain states and also is a function of the fraction of light when the mirror oscillates and stays at an intermediate state. FIG. 5C clearly shows that the gray scale can be flexibly controlled with much greater degree of accuracy since the gray scale is no longer limited by the least significant bit of the control word.

Therefore, in this invention, the gray scales can be controlled by controlling the durations of the micromirror positioned at three different states. Furthermore, oscillation of the micromirrors is controllable to swing from one state to another state at a mid-point of an oscillation cycle. The gray scale GS is therefore functional depends on Ts1, Ts2, and Ts3 that represent lengths of time the micromirror is positioned at different three states, and also depends on the lengths of time for the micromirror to change from one state to another since there will be partial projection of the light to the image pixel from as the micromirror swing through at least one intermediate state.

Figure 6A:
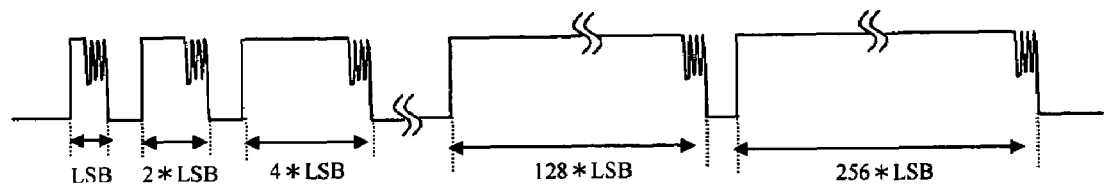
FIG. 6A to 6D are timing diagrams for showing the different time slots a mirror oscillation signal may be inserted to adjust the angular positions of the micromirrors.
Figure 6B:
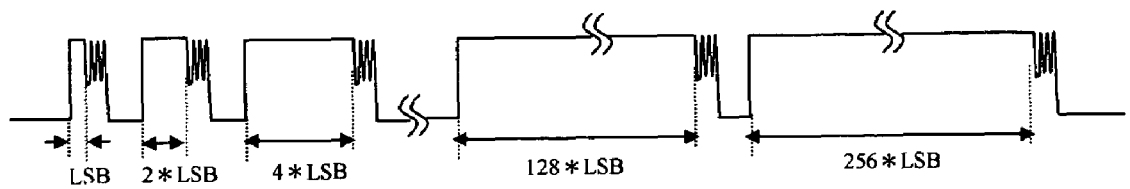
Figure 6C:
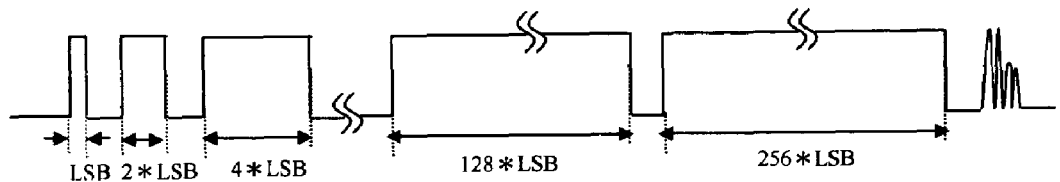
Figure 6D:
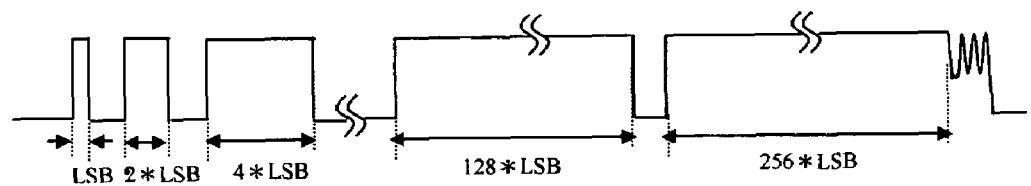

Referring to FIGS. 6A to 6D for a time diagram for showing different methods for inserting the oscillation control signals for initiating a micromirror oscillations. In FIG. 6A, the oscillation control signal are inputted to the control circuit at the end of each control word while in FIG. 6A, the oscillation control signal is inputted to the control circuit right after the time cycle of each control word of different bit lengths. In FIG. 6C, the oscillation control signal is inputted to the control signal after the entire eight-bit control words are completely processed. In FIG. 6D, the control signal is inserted into a time slot in the time period represented by the timing control word that has the most significant bit (MSB).

In a preferred embodiment, this invention further discloses a method for controlling a micromirror that includes a step of controlling a reflecting element supported on a hinge to oscillate between two states and enabling said reflecting elements to project a partial light for contributing to a display light intensity during oscillating between either of said two states.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A micromirror device comprising:
   a reflecting element supported on a hinge for oscillating and positioning at least three angular positions; and
   a control circuit for receiving a series of control words of different number of bits as a time modulation signal to control said reflecting element for controlling a gray scale of display wherein said control circuit further receiving an oscillation signal for superimposing on said time modulation signal for oscillating said reflecting element for further controlling said gray scale of display; and said oscillating signal is provided for controlling said reflecting element to oscillated to a fully on, a fully off and an partially ON angular positions wherein said reflecting element is further controlled by said oscillating signal to change an oscillation direction in an intermediate angular position between said fully on and fully off angular positions.

2. The device of claim 1, wherein:
said series of control words further includes a sequence of control words of a least number of bits to a maximum number of bits.

3. The device of claim 1, wherein:
said series of control words further includes a sequence of control words of a least number of bits to a maximum number of bits with a time gap between each of said control words.

4. The device of claim 3, wherein:
said oscillating signal is received as a two bit signal.

5. The device of claim 3, wherein:
said oscillating signal is inserted into everyone of said series of control words.

6. The device of claim 3, wherein:
said oscillating signal is inserted into a gap between said control words.

7. The device of claim 3, wherein:
said oscillating signal is inserted into a control word of said least number of bits.

8. The device of claim 3, wherein:
said oscillating signal is inserted into a control word of said maximum number of bits.

9. The device of claim 3, wherein:
said oscillating signal is inserted into a gap between every two of said control words.

10. The device of claim 3, wherein:
said oscillating signal is applied to dispose said reflecting element at an intermediate state with a zero degree relative to an incident light.

11. The device of claim 1, wherein:
said reflecting element is further provided for oscillating to said fully on, a fully off and an partially ON angular positions in responding to said series of control words and said oscillating signal inputted as digital control signals.

12. The device of claim 1, wherein:
said reflecting element is further controlled by said oscillating signal inputted as a two-bit digital control signal.

13. The device of claim 1, further comprising:
two electrodes for inputting said oscillating signal for oscillating said reflecting element to different positions.

14. The device of claim 1, further comprising:
two electrodes for inputting said oscillating signal representing by two digital bits with one bit applied to each of said two electrodes for changing a voltage applied thereon for oscillating said reflecting element to different positions.

15. The device of claim 1, further comprising:
a lens for receiving an incident light projection from said reflecting element for projecting an image display light wherein said lens is further disposed for projecting a portion of said image display light as said reflecting element oscillating between a fully on and fully off angular positions.

16. The micromirror device of claim 1 further comprising:
a vacuum seal package for enclosing said reflecting element and said hinge in a sealed vacuum space.

17. The device of claim 1, further comprising:
two separate independently controllable electrodes for inputting said oscillating signal for controlling said reflecting element to oscillate to different positions.

18. The device of claim 1, further comprising:
two separate independently controllable electrodes for inputting said oscillating signal wherein said two separate independently controllable electrodes disposed on two opposite sides of said hinge and each of said electrodes is connected to a control circuit for independently applying a control voltage thereon to control said reflecting element to oscillate to different positions.

19. The device of claim 18, wherein:
each of said electrodes is connected to a transistor having a gate connected to a common wordline and each transistor having a source connected to an independently controllable bitline for independently controlling said reflecting element to oscillate to different positions.

20. The device of claim 19, wherein:
each bitline connected to said source of said transistor is provided for receiving a binary bit represented by zero and one for applying a voltage to said electrodes for independently controlling said reflecting element to oscillate to different positions.

21. The device of claim 19, wherein:
each bitline connected to said source of said transistor is provided for receiving a binary bit represented by zero and one for applying a voltage to said electrodes for applying one of three digital signals represented by (1,0), (0,1) and (0,0) for controlling said reflecting element to oscillate to three different positions.

22. The device of claim 19, wherein:
each bitline connected to said source of said transistor is provided for receiving a binary bit represented by zero and one for applying a voltage to said electrodes for applying one of three digital signals represented by (1,0), (0,1) and (0,0) for controlling said reflecting element to oscillate to angular positions oriented substantially at a positive angle, a negative angle and 0° relative to a perpendicular axis to said reflecting element.

23. A micromirror device comprising:
a reflecting element supported on a hinge for oscillating between two states wherein said reflecting elements is projecting a partial light for contributing to a display light intensity during oscillating between either of said two states;
a control circuit for receiving a series of control words of different number of bits as a time modulation signal to control said reflecting element for controlling a gray scale of display wherein said control circuit further receiving an oscillation signal for superimposing on said time modulation signal for oscillating said reflecting element for further controlling said gray scale of display; and said oscillating signal is provided for controlling said reflecting element to oscillated to a fully on, a fully off and an partially ON angular positions wherein said reflecting element is further controlled by said oscillating signal to change an oscillation direction in an intermediate angular position between said fully on and fully off angular positions.

24. The device of claim 23, wherein:
said series of control words further includes a sequence of control words of a least number of bits to a maximum number of bits.

25. The device of claim 23, wherein:
said series of control words further includes a sequence of control words of a least number of bits to a maximum number of bits with a time gap between each of said control words.

26. The device of claim 23, wherein:
said oscillating signal is received as a two bit signal.

27. The device of claim 25, wherein:
said oscillating signal is inserted into everyone of said series of control words.

28. The device of claim 25, wherein:
said oscillating signal is inserted into a gap between said control words.

29. The device of claim 25, wherein:
said oscillating signal is inserted into a control word of said least number of bits.

30. The device of claim 25, wherein:
said oscillating signal is inserted into a control word of said maximum number of bits.

31. The device of claim 25, wherein:
said oscillating signal is inserted into a gap between every two of said control words.

32. The device of claim 25, wherein:
said oscillating signal is applied to dispose said reflecting element at an intermediate state with a zero degree relative to an incident light.

33. The device of claim 23, wherein:
said partial light for contributing to a display light intensity is further applied by using said oscillation signal for controlling a gray scale of an image display using a light projected from said reflecting element.

34. The device of claim 23, wherein:
said reflecting element is further provided for oscillating to a fully on, a fully off and an partially ON angular positions in responding to said series of control words and said oscillating signal inputted as digital control signals.

35. The device of claim 23, wherein:
said reflecting element is further controlled by said oscillating signal inputted as a two-bit digital control signal.

36. The device of claim 23, further comprising:
two electrodes for inputting said oscillating signal for oscillating said reflecting element to different positions.

37. The device of claim 23, further comprising:
two electrodes for inputting said oscillating signal representing by two digital bits with one bit applied to each of said two electrodes for changing a voltage applied thereon for oscillating said reflecting element to different positions.

38. The device of claim 23, further comprising:
a lens for receiving an incident light projection from said reflecting element for projecting an image display light wherein said lens is further disposed for projecting a portion of said image display light as said reflecting element oscillating between a fully on and fully off angular positions.

39. The micromirror device of claim 23 further comprising:
a vacuum seal package for enclosing said reflecting element and said hinge in a sealed vacuum space.

40. The micromirror device of claim 23, further comprising:
two separate independently controllable electrodes for inputting said oscillating signal for controlling said reflecting element to oscillate to different positions.

41. The micromirror device of claim 23, further comprising:
two separate independently controllable electrodes for inputting said oscillating signal wherein said two separate independently controllable electrodes disposed on two opposite sides of said hinge and each of said electrodes is connected to a control circuit for independently applying a control voltage thereon to control said reflecting element to oscillate to different positions.

42. The micromirror device of claim 41, wherein:
each of said electrodes is connected to a transistor having a gate connected to a common wordline and each transistor having a source connected to an independently controllable bitline for independently controlling said reflecting element to oscillate to different positions.

43. The micromirror device of claim 42, wherein:
each bitline connected to said source of said transistor is provided for receiving a binary bit represented by zero and one for applying a voltage to said electrodes for independently controlling said reflecting element to oscilate to different positions.

44. The micromirror device of claim 42, wherein:
each bitline connected to said source of said transistor is provided for receiving a binary bit represented by zero and one for applying a voltage to said electrodes for applying one of three digital signals represented by (1,0), (0,1) and (0,0) for controlling said reflecting element to oscillate to three different positions.

45. The micromirror device of claim 42, wherein:
each bitline connected to said source of said transistor is provided for receiving a binary bit represented by zero and one for applying a voltage to said electrodes for applying one of three digital signals represented by (1,0), (0,1) and (0,0) for controlling said reflecting element to oscillate to angular positions oriented substantially at a positive angle, a negative angle and 0° relative to a perpendicular axis to said reflecting element.

46. The micromirror device of claim 23, further comprising:
said control circuit operated at a voltage substantially about five volts for controlling said reflecting element to oscillate to different positions.

47. The micromirror device of claim 23, wherein:
said control circuit further receiving said control words having a maximum number of bits of at least ten bits for operating at a voltage substantially about twenty volts for controlling said reflecting element to oscillate to different positions.

48. The micromirror device of claim 23, wherein:
said micromirror device further constituting a CMOS micromirror device.

49. The micromirror device of claim 23, wherein:
said micromirror device further constituting a DMOS micromirror device.

50. The micromirror device of claim 23, wherein:
said micromirror device further constituting a PMOS micromirror device.

51. The micromirror device of claim 23, wherein:
said micromirror device further constituting a NMOS micromirror device.

52. The micromirror device of claim 23, wherein:
said reflecting element further comprising a multiple layer reflecting surface for improving reflectance from said reflecting element.

53. A method for controlling a micromirror device comprising:
disposing a reflecting element supported on a hinge to oscillate between two states and enabling said reflecting elements to project a partial light for contributing to a display light intensity during oscillating between either of said two states;
receiving a series of control words of different number of bits as a time modulation signal to control said reflecting element for controlling a gray scale of display;
receiving an oscillation signal for superimposing on said time modulation signal for oscillating said reflecting element for further controlling said gray scale of display; and
controlling said reflecting element by said oscillating signal to oscillate to a fully on, a fully off and an partially ON angular positions and further controlling said reflecting element by said oscillating signal to change an oscillation direction in an intermediate angular position between said fully on and fully off angular positions.

54. The method of claim 49, further comprising:
applying a CMOS integrate circuit manufacturing process for manufacturing said micromirror device.

* * * * *